United States Patent [19]

Malwitz

[11] Patent Number: 4,680,324

[45] Date of Patent: Jul. 14, 1987

[54] FIRE-RETARDANT PLASTICS WITH GLYCOSIDE ADDITIVE

[75] Inventor: Nelson E. Malwitz, Brookfield, Conn.

[73] Assignee: Sealed Air Corporation, Danbury, Conn.

[21] Appl. No.: 768,611

[22] Filed: Aug. 23, 1985

[51] Int. Cl.[4] .................. C08K 50/07; C08K 3/32; C08K 3/10
[52] U.S. Cl. ........................................ 524/58; 524/72; 524/409; 524/414; 252/609; 260/DIG. 24
[58] Field of Search ............... 524/56, 58, 72, 414, 524/409; 252/609; 260/DIG. 24

[56] References Cited

U.S. PATENT DOCUMENTS 2,773,848  12/1956  Lindenfelser ............... 524/58
2,867,590   1/1959  Coutras et al. ............. 524/58

FOREIGN PATENT DOCUMENTS 7211671  4/1972  Japan ........................... 524/58

OTHER PUBLICATIONS

Štěpek et al, Additives for Plastics, Springer-Verlag, New York, 1983, pp. 201-216.

*Primary Examiner*—John Kight
*Assistant Examiner*—Nathan M. Nutter
*Attorney, Agent, or Firm*—Bell, Seltzer, Park & Gibson

[57] ABSTRACT

The fire retardant characteristics of a melt producable plastic is enhanced by mixing with the plastic a fire retardant compound and a glycoside.

17 Claims, No Drawings

FIRE-RETARDANT PLASTICS WITH GLYCOSIDE ADDITIVE

FIELD OF THE INVENTION

This invention relates to fire-retardant plastics generally, and more particularly to melt producable plastics having improved fire-retardant properties containing glycosides.

BACKGROUND OF THE INVENTION

There are numerous methods available for imparting fire-retardant characteristics to plastics. Typical techniques include the addition of a phosphorous, antimony or halogen-containing compound to the plastic during the production stage. Some of these compounds are used in conjunction with one another: antimony compounds and halogen compounds are, in particular, frequently combined together to impart fire-retardant characteristics to melt produced plastics.

The efficacy of these fire retardants is determined by standardized testing procedures which measure the concentration of oxygen to which a treated plastic must be exposed in order to sustain burning. Any increase in the required oxygen concentration reflects improved fire-retardant properties for the composition being treated.

The present invention is based on applicant's discovery that the fire-retardant characteristics of a melt producable plastic composition which contains a usual fire-retardant additive such as a phosphorous, antimony, or halogen-containing compound can be enhanced by incorporating a glycoside into the composition. It is hypothesized that this result is achieved when the fire retardant compound catalyzes the dehydration of the glycoside, with a concomitant expenditure of energy. It is further hypothesized that the carbon remaining from the dehydration reaction forms a stable carbonaceous barrier, or char, which serves to prevent unburned material below the char from being exposed to combustion. The applicant, however, does not wish to be bound to any particular hypothesized mechanism for the novel result herein set forth.

Glycosides such as alpha-alkyl-dextro glycosides have been used heretofore as additives to thermoset plastics. For example, U.S. Pat. Nos. 2,773,788; 2,773,848 and 2,867,590 disclose the use of an alpha-alkyl-D-glucosides as a modifier in a thermosetting aminoplast resins such as melamine-formaldehyde resins and urea-formaldehyde resins. None of these references, however, discloses the use of alpha-alkyl-D-glucoside as a fire-retarding additive in a thermoplastic or otherwise melt produced plastic.

Derivatized alpha-alkyl-D-glucosides have also been used, not as an additive, but as the polyether polyol backbone in polyurethanes. It has been suggested that polyurethanes prepared in such a way are more fire resistant, but applicant is unaware of any information stemming from this art suggesting that glycosides be used as a fire retardant in melt produced plastics.

In accordance with the present invention, the glycoside is mixed with a meltable polymer and the usual flame retardant additives, and a homogeneous blend or mixture thereof is formed. For example, the mixture may be melted so that the glycoside is homogeneously dispersed therein, and the molten composition is then extruded, cast or otherwise formed into the desired shape and allowed to cool and harden.

The glycoside used herein could be a glucoside, fructoside, mannoside, galactoside, or any other acetal derived from the combination of a hydroxy compound with a sugar. Of these compounds, glucosides are preferred.

The glucoside additive could be any alpha or beta substituted glycoside, with alpha-substituted D-glucosides preferred. Considered especially useful are glucosides with the "R" group being a stable substitution such as an alkyl or aryl, with the substitution containing any degree of saturation or unsaturation or any stable functional group, such as a hydroxyl, chloride, bromide, sulfate, phosphate, amine, ether, or epoxy. Particularly preferred are the alpha-alkyl-D-glucosides, such as alpha-methyl-D-glucoside and alpha-butyl-D-glucoside. Alpha-methyl-D-glucoside is commercially available from the A. E. Staley Manufacturing Co., 2200 Eldorado Street, Decatur, Ill., Zip Code 62525. The glucoside could have an average degree of polymerization (DP) up to about 5, with a DP equal to one being the pure glucoside.

A crucial advantage provided by glycosides is their thermal stability: they do not carmelize at the melt temperatures encountered during the production of melt produced plastics. This advantage is not obtained with unmodified carbohydrates. We have further found that any browning of the glycoside can be reduced by adding sodium sulfite or other suitable antioxidant to the composition of the invention during processing. Also, melt formulation compositions and process conditions such as temperature profile and quenching methods can be judiciously selected to minimize or eliminate browning. These techniques will be familiar to those practiced in the art.

Typical fire retardants which may be used in the present invention are those conventionally employed as fire retardants in plastics, and may be characterized as compounds that contain elements from Group 5 or Group 7 of the periodic table. Especially suitable are those compounds that contain the elements phosphorous, chlorine, bromine or antimony. These compounds may be used alone or in any combination with one another, or in combination with compounds containing Group 3 elements. The compounds can be either organic or inorganic. Examples of suitable flame retardants include, for example, sodium chloride, calcium chloride, decabromodiphenyloxide, decabromobiphenylether, metal oxides, and chlorides such as antimony oxide and antimony oxychloride and phosphorous compounds such as tricresyl phosphate, tris(2-chloroethyl)-phosphate, trix(chloropropyl)phosphate, O,O-diethyl-N,N-bis-(2-hydroethyl-)aminomethyl phosphate, tris(B-chloroethyl)phosphate, tris(dichloroproply)-phosphate, tris(2,3-dibromopropyl)phosphate, dipropylene glycol phosphonate, ammonium polyphosphate, tetrakis(2-chloroethyl)ethylene diphosphate, and tetrakis(2-chloroethyl)-dichloroneopentyl diphosphate, magnesium sulfate, alumina, borax, and alkali-metal borates.

For the purposes of the present invention, the term "melt producable plastic" is intended to encompass those resinous materials which are capable of being melted, including both thermoplastic compositions and thermoset compositions which have thermoplastic properties during the production stage and can be melted and processed like a thermoplastic. Examples of thermoplastic materials which are suited to the present invention include homopolymers or copolymers based upon the following: polyethylene, chlorinated polyethylene, acrylonitrile copolymers such as acrylonitrile-butadiene-styrene (ABS), ABS/polycarbonate alloy, ABS/polysulfone alloy, polyvinyl chloride (PVC), ABS/PVC blends, polyvinyl chloride-acetate, styrene-acrylonitrile, fluoroplastics such as ethylene-chlorotrifluoroethylene, fluorinated ethylene propylene and ethylene tetrafluoroethylene, ethylene-ethyl acrylate, ethylene methyl acrylate, ethylene vinyl acetate, ethylene vinyl alcohol, methacrylates such as methylmethacrylate, chloroethylmethacrylate, n-butyl-methacrylate, isobutylmethacrylate, isopropylmethacrylate, polyamides such as Nylon 6, Nylon 6/6, Nylon 6/9, Nylon 6/10, Nylon 6/11, Nylon 6/12, Nylon 8, Nylon 11, phenylene oxide-based resins, polyaryl sulfone, polycaprolactones, polycarbonate, polycarbonate/polyester alloy, polymethyl pentene, polyphenylene sulfide, polyphenyl sulfone, polypropylene, polystyrene, polystyrene copolymers, polyvinyl acetate, polyvinyl alcohol, and polyvinyl butyral.

As mentioned above, thermoset compositions which have thermoplastic properties during the production stage and can be melted and processed like a thermoplastic can also be used. Examples of such compositions include cross-linkable polyethylenes, thermoplastic polyimide, thermoplastic polyurethane, thermoplastic polyarylate, thermoplastic polybutadiene and thermoplastic polybutylenes.

The melt producable product may be in the form of molded or extruded articles, films or glues. It is also contemplated that the product may be formed as a latex composition containing a dispersion of the meltable polymer with the glycoside and flame retardant compound or compounds.

The glycoside can be included in the composition of the invention in an amount of from 1 to 40 percent by weight, with a range of 5 to 15 percent being most preferred. Those skilled in the art of formulating thermoplastics will be able to arrive at a concentration which provides the best balance between enhanced flame retardancy and other physical characteristics for the particular use of the composition which they intend. The proportion of the conventional fire retardants typically ranges from 2% to 30% of the weight of the melt produced plastic.

EXAMPLES

Alpha-methyl-D-glucoside was mixed with granules of low density polyethylene (LDPE) and with flame retardant compounds in the proportions set forth in Table 1 and extruded into films. The films were then used for oxygen index testing by the ASTM D 2863-77 standard method. The results of the test are also set forth in Table 1.

TABLE 1

| | Flame-Retardant Samples | % | Oxygen Index |
|---|---|---|---|
| A. (control) | LDPE | 100 | 17 |
| B. (control) | LDPE | 82 | |
| | Antimony Oxide | 6 | 25 |
| | Decabromodiphenyloxide | 12 | |
| C. | LDPE | 76.75 | |
| | Antimony Oxide | 6 | |
| | Decabromodiphenyloxide | 12 | 26 |
| | Alpha-methyl-D-Glucoside | 5 | |
| | Sodium Sulfite | 0.25 | |
| D. | LDPE | 71.75 | |
| | Antimony Oxide | 6 | |

TABLE 1-continued

| | Flame-Retardant Samples | % | Oxygen Index |
|---|---|---|---|
| | Decabromodiphenyloxide | 12 | 27 |
| | Alpha-methyl-D-Glucoside | 10 | |
| | Sodium Sulfite | 0.25 | |
| E. | LDPE | 76.5 | |
| | Antimony Oxide | 6 | |
| | Decabromodiphenyloxide | 12 | 26 |
| | Alpha-methyl-D-Glucoside | 5 | |
| | Sodium Sulfite | 0.5 | |
| F. | LDPE | 74.62 | |
| | Antimony Oxide | 6 | |
| | Decabromodiphenyloxide | 12 | 25.5 |
| | Alpha-methyl-D-Glucoside | 5 | |
| | Sodium Sulfite | 0.25 | |
| | Calcium Carbonate | 2 | |
| | Calcium Oxide | 0.13 | |

Table 1 demonstrates that, in all instances where alpha-methyl-D-glucoside was added to the composition, the combustion resistance of the material was increased. This is indicated by the "Oxygen Index" column of Table 1, which reflects an increasing oxygen concentration required to sustain burning as the value of the Oxygen Index increases.

That which is claimed is:

1. A plastic composition having fire-retardant properties, said composition comprising a melt producable plastic composition, a fire-retardant compound comprising at least one member selected from the group consisting of antimony compounds, phosphorous compounds, chlorine compounds and bromine compounds, and a glycoside.

2. A composition according to claim 1 wherein said glycoside comprises an alkyl glucoside.

3. A composition according to claim 2 wherein said alkyl glucoside is alpha-methyl-D-glucoside.

4. A composition according to claim 1 wherein said glycoside comprises an alkyl fructoside.

5. A composition according to claim 1 wherein said melt producable plastic is a thermoset polymer having thermoplastic properties during the production stage, and can be melted and processed like a thermoplastic before the composition is thermoset.

6. A thermoplastic composition having fire-retardant properties, comprising:
(a) a synthetic thermoplastic polymer;
(b) a fire retardant compound comprising at least one member selected from the group consisting of antimony compounds, phosphate compounds, chloride compounds and bromine compounds; and
(c) an alkyl glucoside.

7. A composition according to claim 6 wherein the proportion of the fire retardant is from 2 to 30% of the weight of the polymer material.

8. A composition according to claim 6 wherein the proportion of the alkyl glucoside is from 1 to 40% of the weight of the polymer material.

9. A thermoplastic composition having improved fire-retardant properties, comprising:
(a) polyethylene;
(b) a fire-retardant compound comprising at least one member selected from the group consisting of antimony compounds, phosphorous compound, chlorine compounds and bromine compounds; and
(c) an alpha-alkyl-D-glucoside wherein the alkyl group has from 1 to 20 carbons.

10. A composition as claimed in claim 9 wherein the alpha-alkyl-D-glucoside is alpha-methyl-D-glucoside.

11. A composition as claimed in claim 9 wherein the proportion of the alpha-alkyl-D-glucoside is from 5 and 15% of the weight of the polymer material.

12. Th method of making a fire-retardant melt producable plastic, comprising the steps of:
(a) forming a mixture of a plastic, a fire-retardant compound selected from the group consisting of antimony compounds, phosphorous compounds, chlorine compounds and bromine compounds, and a glycoside;
(b) melting said mixture so that said glycoside is homogeneously dispersed therein; and
(c) allowing said mixture to cool and harden.

13. The method according to claim 12 wherein said glycoside comprises an alkyl glucoside.

14. The method according to claim 13 wherein said alkyl glucoside is alpha-methyl-D-glucoside.

15. A product made by the method of claim 12.

16. A plastic composition having fire-retardant properties, comprising: a thermoplastic polymer; a fire-retardant compound selected from the group consisting of antimony compounds, phosphorous compounds, chlorine compounds and bromine compounds; and a glycoside.

17. A plastic composition having fire-retardant properties, comprising: a melt producable thermosetting plastic which can be melted and processed like a thermoplastic before the composition is thermoset, and which is selected from the group consisting of cross-linkable polyethylenes, thermoplastic polyimide, thermoplastic polyurethane, thermoplastic polyarylate, thermoplastic polybutadiene, and thermopolastic polybutylenes; a fire-retardant compound selected from the class consisting of antimony compounds, phosphate compounds, chlorine compounds, and bromine compounds; and a glycoside.

* * * * *